United States Patent
Park et al.

(10) Patent No.: US 10,841,947 B2
(45) Date of Patent: Nov. 17, 2020

(54) METHOD FOR TRANSMITTING AND RECEIVING UPLINK SIGNAL IN WIRELESS COMMUNICATION SYSTEM SUPPORTING UNLICENSED BAND AND APPARATUS FOR SUPPORTING SAME

(71) Applicant: LG Electronics Inc., Seoul (KR)

(72) Inventors: Hanjun Park, Seoul (KR); Joonkui Ahn, Seoul (KR); Suckchel Yang, Seoul (KR); Yunjung Yi, Seoul (KR); Seonwook Kim, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 40 days.

(21) Appl. No.: 16/091,804

(22) PCT Filed: Dec. 28, 2016

(86) PCT No.: PCT/KR2016/015397
§ 371 (c)(1),
(2) Date: Oct. 5, 2018

(87) PCT Pub. No.: WO2017/179798
PCT Pub. Date: Oct. 19, 2017

(65) Prior Publication Data
US 2019/0166617 A1 May 30, 2019

Related U.S. Application Data

(60) Provisional application No. 62/335,635, filed on May 12, 2016, provisional application No. 62/331,445, (Continued)

(51) Int. Cl.
*H04W 72/14* (2009.01)
*H04L 5/00* (2006.01)
(Continued)

(52) U.S. Cl.
CPC .......... *H04W 72/14* (2013.01); *H04L 1/1819* (2013.01); *H04L 1/1822* (2013.01); *H04L 5/00* (2013.01);
(Continued)

(58) Field of Classification Search
None
See application file for complete search history.

(56) References Cited

U.S. PATENT DOCUMENTS

2009/0279460 A1* 11/2009 Sarkar ................... H04L 1/1621
370/280
2012/0127938 A1* 5/2012 Lv ...................... H04W 72/1205
370/329
(Continued)

FOREIGN PATENT DOCUMENTS

EP        2525522        11/2012

OTHER PUBLICATIONS

International Search Report in International Application No. PCT/KR2016/015397, dated Apr. 11, 2017, 17 pages (with English Translation).

(Continued)

*Primary Examiner* — Noel R Beharry
*Assistant Examiner* — Pamit Kaur
(74) *Attorney, Agent, or Firm* — Fish & Richardson P.C.

(57) ABSTRACT

The present invention discloses a method for a base station or a user equipment to transmit and receive an uplink signal between the base station and the user equipment in an LAA (licensed assisted access) system performing LBT (listen-before-talk)-based signal transmission and an apparatus supporting the same.
Specifically, the present invention proposes a method for the base station and the user equipment to transmit an uplink
(Continued)

signal according to a scheduling type indicated to the user equipment by the base station and an apparatus supporting the same.

8 Claims, 12 Drawing Sheets

Related U.S. Application Data filed on May 4, 2016, provisional application No. 62/324,353, filed on Apr. 19, 2016, provisional application No. 62/322,200, filed on Apr. 13, 2016.

(51) Int. Cl.
*H04L 1/18* (2006.01)
*H04W 72/12* (2009.01)
*H04W 72/04* (2009.01)
*H04W 74/08* (2009.01)

(52) U.S. Cl.
CPC ... *H04W 72/0446* (2013.01); *H04W 72/1289* (2013.01); *H04W 74/0808* (2013.01); *H04L 1/1887* (2013.01)

(56) References Cited

U.S. PATENT DOCUMENTS

| | | | |
|---|---|---|---|
| 2013/0258978 A1* | 10/2013 | Aiba | H03M 13/6356 370/329 |
| 2015/0351092 A1 | 12/2015 | Seo et al. | |
| 2016/0065332 A1 | 3/2016 | Yum et al. | |
| 2016/0278050 A1* | 9/2016 | Nory | H04L 5/0051 |
| 2018/0109358 A1* | 4/2018 | Xing | H04L 1/1816 |

OTHER PUBLICATIONS

Catt, "UL scheduling for Rel-14 eLAA," 'R1-162260', 3GPP TSG RAN WG1 Meeting #84bis, Busan, Korea Apr. 11-15, 2016, 4 pages.
Intel Corporation, "Signaling for Flexible Timing UL Scheduling," 'R1-162352', 3GPP TSG RAN WG1 Meeting #84bis, Busan, Korea, Apr. 11-15, 2016, 5 pages.
Nokia, Alcatel-Lucent Shanghai Bell, "On LAA UL scheduling and UL grant enhancements," 'R1-162784', 3GPP TSG RAN WG1 Meeting #84bis, Busan, Korea, Apr. 11-15, 2016, 10 pages.
Extended European Search Report in European Application No. 16898760.0, dated Sep. 18, 2019, 10 pages.

* cited by examiner (a)

METHOD FOR TRANSMITTING AND RECEIVING UPLINK SIGNAL IN WIRELESS COMMUNICATION SYSTEM SUPPORTING UNLICENSED BAND AND APPARATUS FOR SUPPORTING SAME

CROSS-REFERENCE TO RELATED APPLICATIONS

This application is a National Stage application under 35 U.S.C. § 371 of International Application No. PCT/KR2016/015397, filed on Dec. 28, 2016, which claims the benefit of U.S. Provisional Application No. 62/335,635, filed on May 12, 2016, U.S. Provisional Application No. 62/331,445, filed on May 4, 2016, U.S. Provisional Application No. 62/324,353, filed on Apr. 19, 2016, and U.S. Provisional Application No. 62/322,200, filed on Apr. 13, 2016. The disclosures of the prior applications are incorporated by reference in their entirety.

TECHNICAL FIELD

Following description relates to a wireless communication system supporting an unlicensed band, and more particularly, to a method of transmitting and receiving an uplink signal between a UE and a base station in a wireless communication system supporting an unlicensed band and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Task

An object of the present invention is to provide a method for a UE to transceive an uplink signal with a base station when the UE or the base station performs LBT (listen-before-talk)-based signal transmission.

In particular, the object of the present invention is to provide a method for a specific UE to efficiently transceive an uplink signal with a base station in an unlicensed band capable of being used by a plurality of nodes.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method of transmitting and receiving an uplink signal between a user equipment and a base station in a wireless communication system supporting an unlicensed band and an apparatus therefor.

To achieve these and other advantages and in accordance with the purpose of the present invention, as embodied and broadly described, according to one embodiment, a method of transmitting an uplink signal, which is transmitted by a user equipment to a base station in a wireless communication system supporting an unlicensed band, includes the steps of receiving an uplink grant for scheduling uplink signal transmission for one or more subframes from the base station, wherein the uplink grant individually indicates an RV (redundancy version) value for the one or more subframes, and transmitting the uplink signal in a time resource scheduled by the uplink grant by applying an identical RV value to a plurality of codewords for each of the one or more subframes.

To further achieve these and other advantages and in accordance with the purpose of the present invention, according to a different embodiment, a method of receiving an uplink signal, which is received by a base station from a user equipment in a wireless communication system supporting an unlicensed band, includes the steps of transmitting an uplink grant for scheduling uplink signal transmission for one or more subframes to the user equipment, wherein the uplink grant individually indicates an RV (redundancy version) value for the one or more subframes, and receiving the uplink signal of which an identical RV value is applied to a plurality of codewords for each of the one or more subframes from the user equipment in a time resource scheduled by the uplink grant.

To further achieve these and other advantages and in accordance with the purpose of the present invention, according to a further different embodiment, a user equipment transmitting an uplink signal to a base station in a wireless communication system supporting an unlicensed band includes a receiver, a transmitter, and a processor configured to operate in a manner of being connected with the receiver and the transmitter. In this case, the processor is configured to receive an uplink grant for scheduling uplink signal transmission for one or more subframes from the base station.

In this case, the uplink grant individually indicates an RV (redundancy version) value for the one or more subframes. The processor is configured to transmit the uplink signal in a time resource scheduled by the uplink grant by applying an identical RV value to a plurality of codewords for each of the one or more subframes.

To further achieve these and other advantages and in accordance with the purpose of the present invention, according to a further different embodiment, a base station receiving an uplink signal from a user equipment in a wireless communication system supporting an unlicensed band includes a receiver, a transmitter, and a processor configured to operate in a manner of being connected with the receiver and the transmitter. In this case, the processor is configured to transmit an uplink grant for scheduling uplink signal transmission for one or more subframes to the user equipment.

In this case, the uplink grant individually indicates an RV (redundancy version) value for the one or more subframes.

The processor is configured to receive the uplink signal of which an identical RV value is applied to a plurality of codewords for each of the one or more subframes from the user equipment in a time resource scheduled by the uplink grant.

In this case, the RV value may consists of 2 bits.

Or, a bit size of an RV value, which is indicated by the uplink grant for a specific subframe, may be differently configured, according to whether the number of subframes scheduled by the uplink grant corresponds to 1 or a plural number.

For example, if the number of subframes scheduled by the uplink grant corresponds to 1, an RV value indicated to the single subframe may consists of 2 bits. If the number of subframes scheduled by the uplink grant corresponds to the plural number, an RV value indicated to each of a plurality of the subframes may consists of 1 bit.

And, the uplink grant additionally indicates a combination of selecting HARQ process indexes applied to the one or more subframes from among N number of HARQ (hybrid automatic retransmission request) process indexes and the uplink signal can be configured based on the HARQ process indexes applied to the one or more subframes.

In particular, the HARQ process indexes indicated by the uplink grant for the one or more subframes can be applied according to a prescribed order.

The above-described aspects of the present invention are merely a part of preferred embodiments of the present invention. Those skilled in the art will derive and understand various embodiments reflecting the technical features of the present invention from the following detailed description of the present invention.

Advantageous Effects

As is apparent from the above description, the embodiments of the present disclosure have the following effects.

First of all, according to the present invention, it is able to perform uplink transmission and reception between a UE and a base station according to a scheduling scheme different from a scheduling scheme of a legacy LTE system in a wireless access system supporting an unlicensed band.

Secondly, when a UE transmits and receives a signal via an unlicensed band, it may be able to minimize a case that the UE fails to transmit an uplink signal at the timing scheduled by other nodes by occupying the unlicensed band.

It will be apparent to those skilled in the art that various modifications and variations can be made in the present disclosure without departing from the technical features or scope of the disclosures. Thus, it is intended that the present disclosure covers the modifications and variations of this disclosure provided they come within the scope of the appended claims and their equivalents.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE

Mode for Invention

Figure 1:
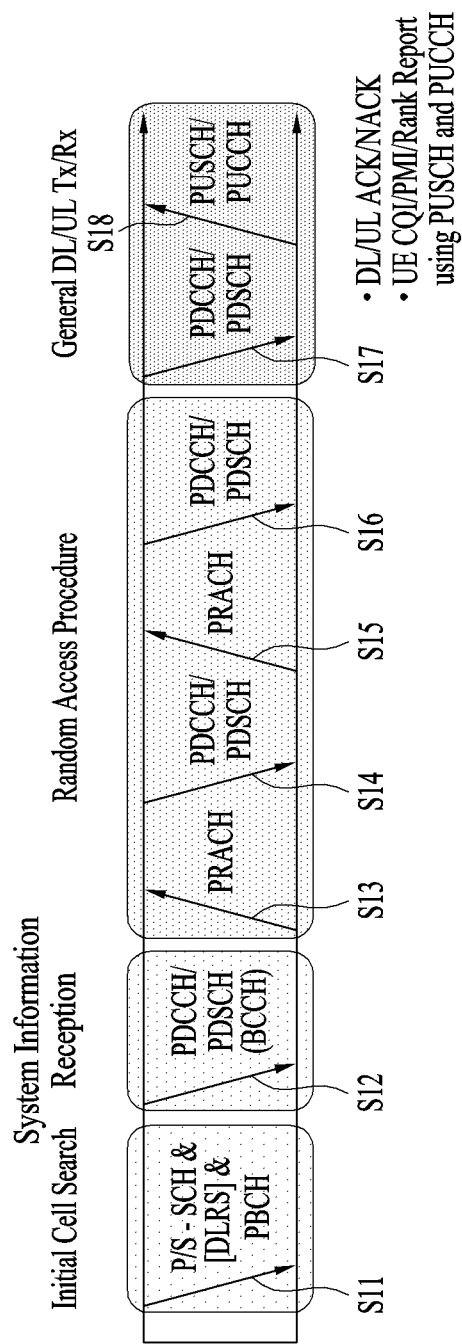
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS).

3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
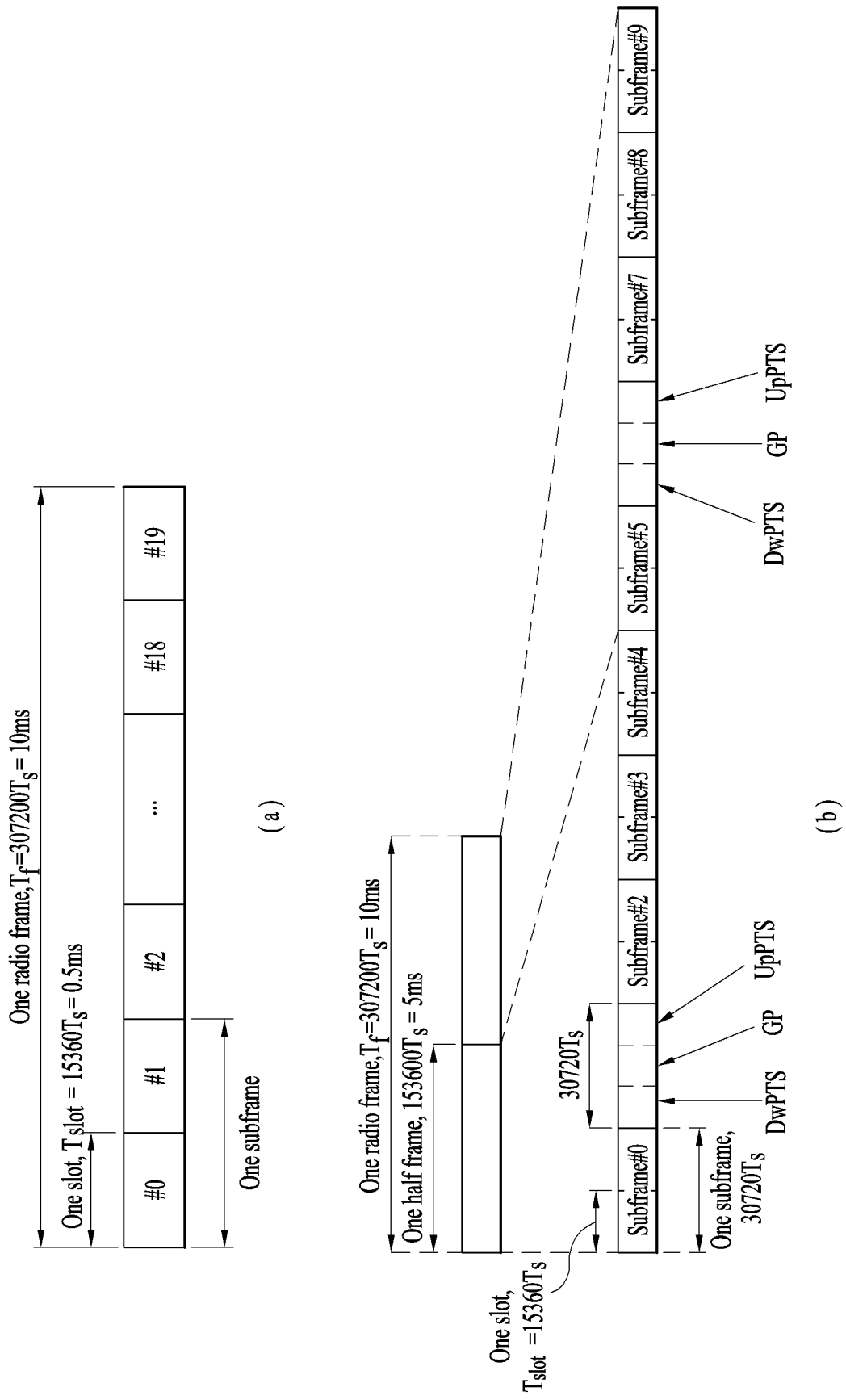
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

Figure 3:
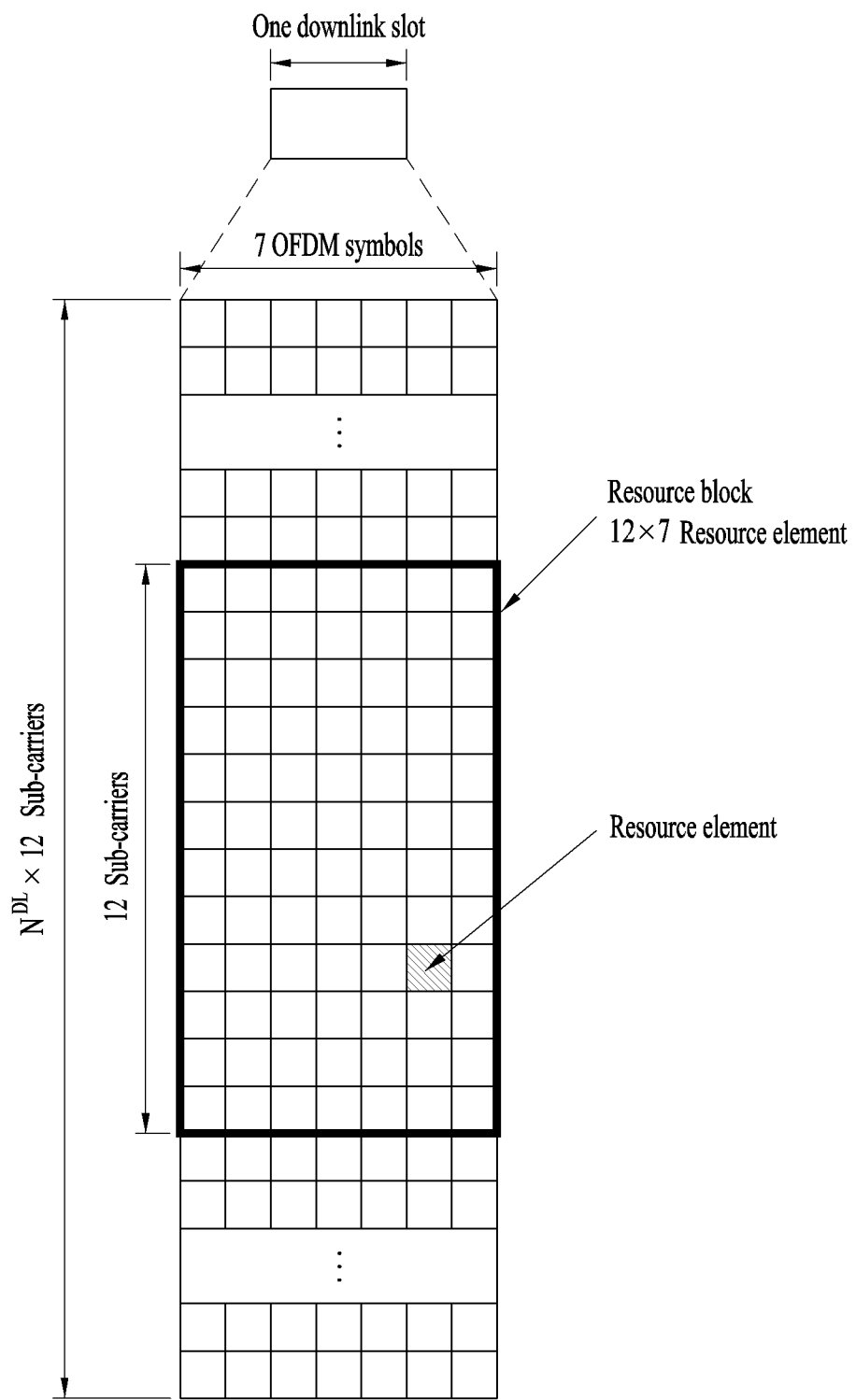
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
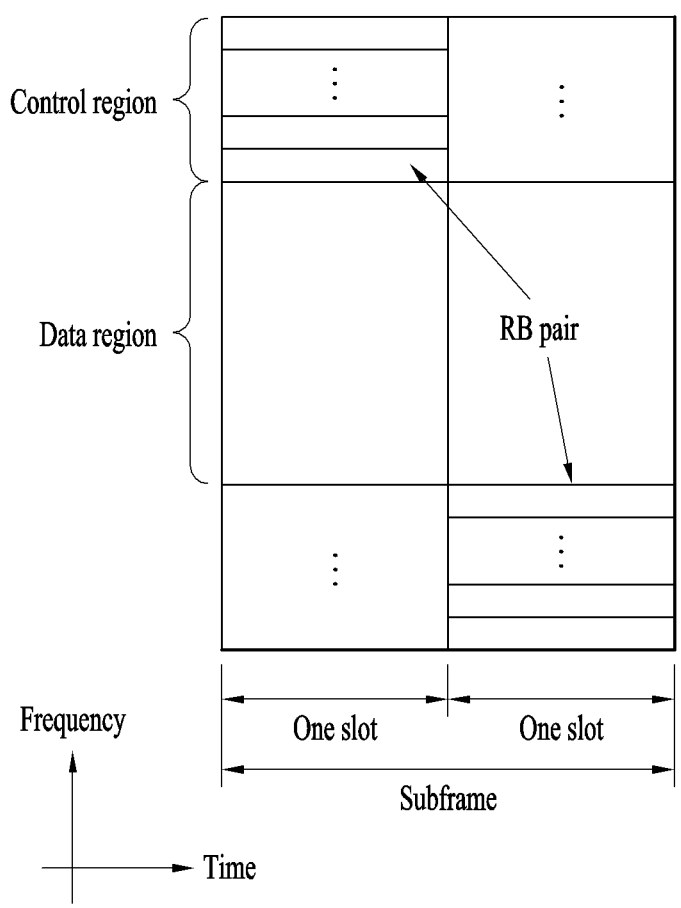
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
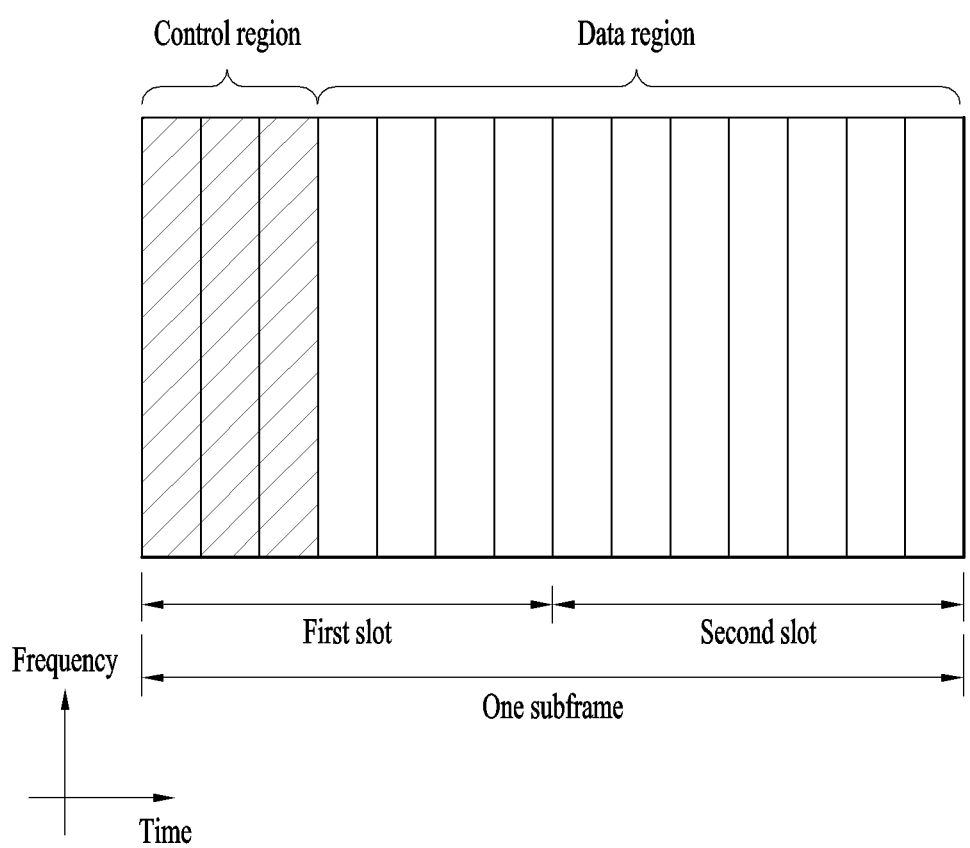
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. LTE-U System

2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating in an unlicensed band is referred to as LAA (licensed assisted access). Or, the LAA may correspond to a scheme of performing data transmission/reception in an unlicensed band in a manner of being combined with a licensed band.

Figure 6:
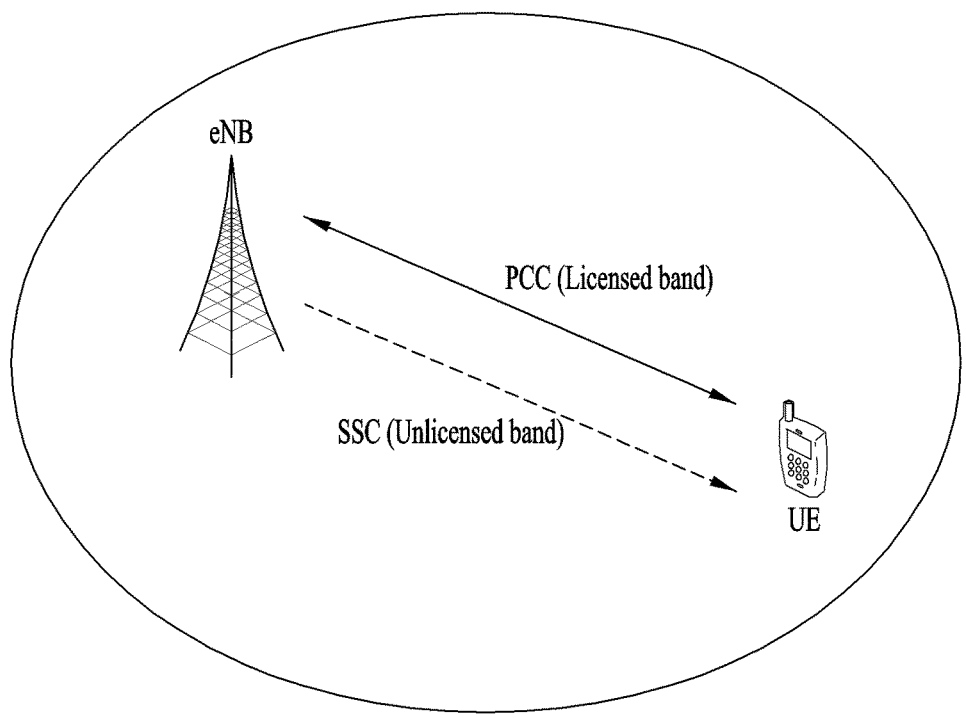
FIG. 6 is a diagram illustrating an exemplary CA environment supported in an LTE-Unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
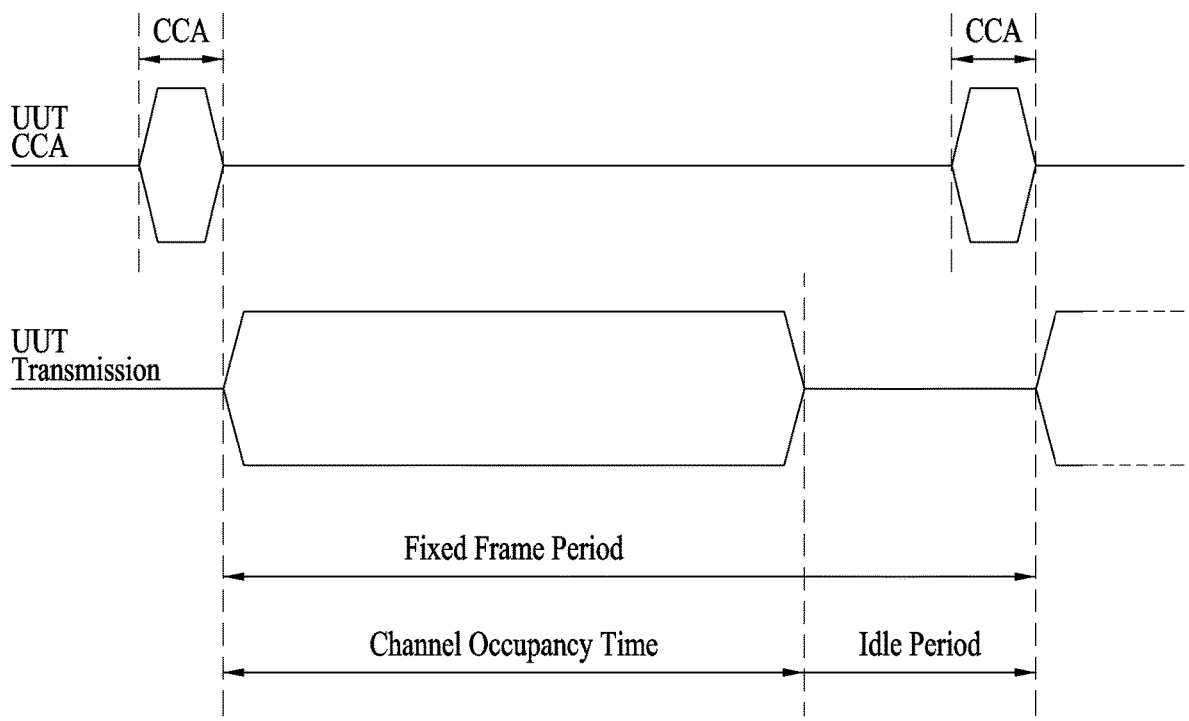
FIG. 7 is a diagram illustrating an exemplary Frame Based Equipment (FBE) operation as one of Listen-Before-Talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
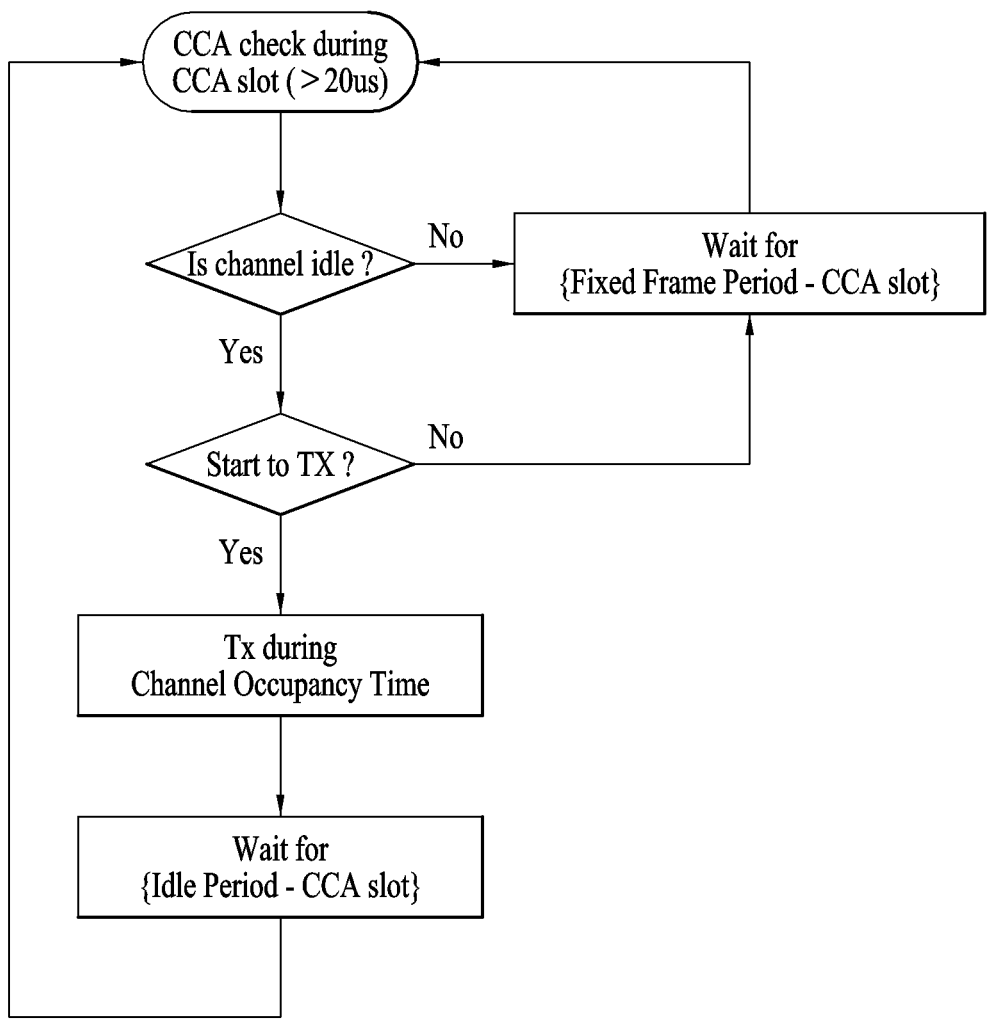
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot. If the channel is idle, the communication node performs data transmission (Tx). If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

Figure 9:
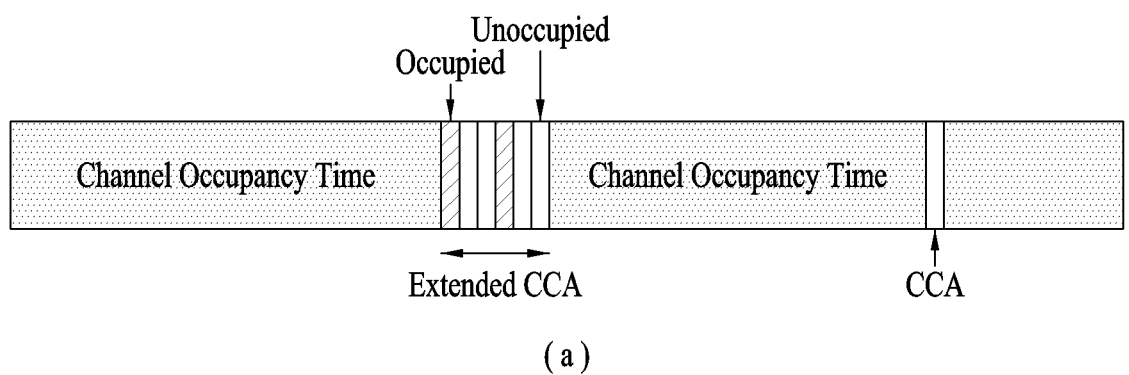
FIG. 9 is a diagram illustrating an exemplary Load Based Equipment (LBE) operation as one of the LBT operations.

FIG. 9 is a view illustrating an exemplary LBE operation as one of the LBT operations.

Referring to FIG. 9(*a*), in LBE, the communication node first sets q (q∈{4, 5, . . . , 32}) and then performs CCA during one CCA slot.

FIG. 9(*b*) is a block diagram illustrating the LBE operation. The LBE operation will be described with reference to FIG. 9(*b*).

The communication node may perform CCA during a CCA slot. If the channel is unoccupied in a first CCA slot, the communication node may transmit data by securing a time period of up to (13/32)q ms.

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms.

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
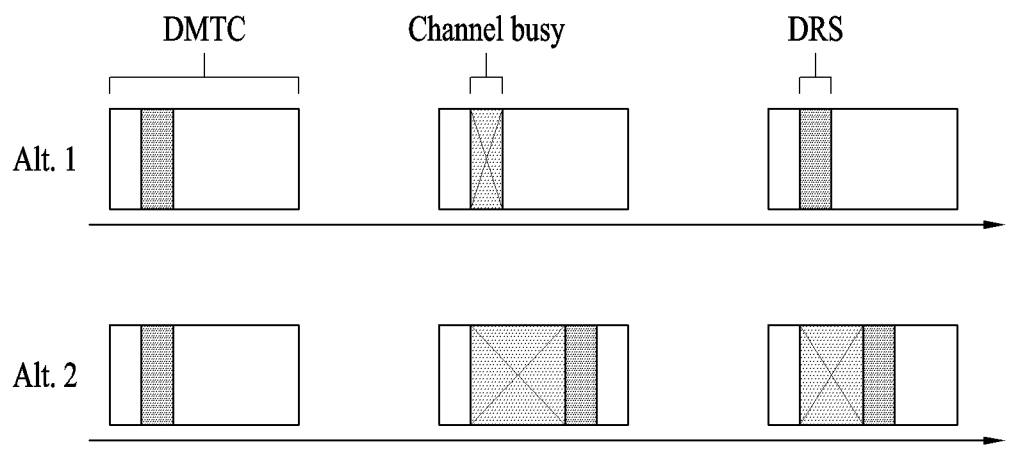
FIG. 10 is a diagram for explaining DRS transmission methods supported by LAA system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
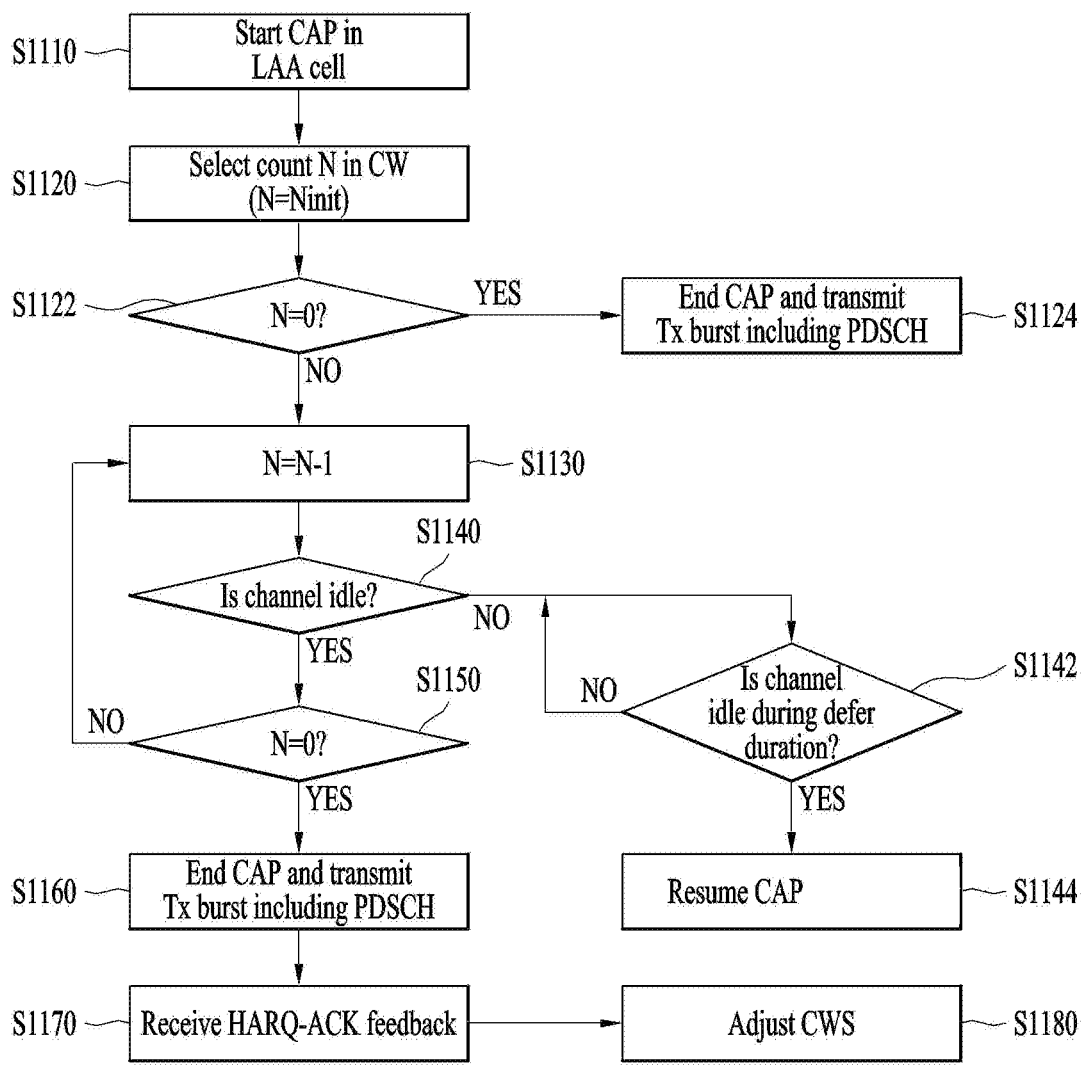
FIG. 11 is a flowchart for explaining CAP and CWA.

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N in a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

3. Proposed Embodiments

When a base station or a user equipment (UE) performs LBT-based signal transmission in a wireless communication system consisting of the base station and the UE, the present invention proposes a method of supporting available contiguous UL transmission by differently configuring transmission timing according to a TTI (transmission time interval) (or a subframe (SF)) of a UL transmission data transmitted to the base station by the UE.

A basic UL transmission structure of LAA system according to the present invention may follow a UL transmission structure of a legacy LTE system. For example, if the base station transmits DL control information (or a UL grant), which indicate UL data to be transmitted in an $n^{th}$ subframe, the UE may attempt to transmit PUSCH (physical uplink shared channel) in an $(n+L)^{th}$ subframe (e.g., L=4) according to the DL control information. In this case, due to the characteristic of the LAA system, each of the base station and the UE can perform LBT to transmit and receive the control information and the PUSCH.

Figure 12:
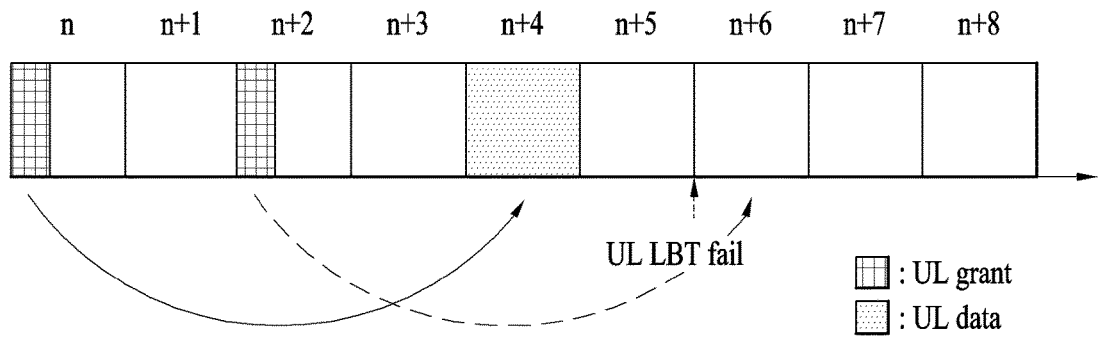
FIG. 12 is a diagram illustrating a PUSCH transmission operation of a UE in LAA system.

FIG. 12 is a diagram illustrating a PUSCH transmission operation of a UE in LAA system When L corresponds to 4.

As shown in FIG. 12, if a base station succeeds in performing DL LBT prior to an $n^{th}$ subframe, the base station transmits a UL grant, which indicates PUSCH to be transmitted in an (n+4)t subframe, to a UE. Having received the UL grant, the UE attempts to perform UL LBT prior to the $(n+4)^{th}$ subframe. If the UE succeeds in accessing a channel through the UL LBT, the UE can transmit the PUSCH in the $(n+4)^{th}$ subframe.

On the contrary, due to the characteristic of the LAA system, the UE may fail to perform PUSCH transmission in a corresponding subframe in response to a UL grant received from the base station. As shown in FIG. 12, although the base station performs a DL LBT operation, succeeds in accessing a channel, and transmits a UL grant in an $(n+2)^{th}$ subframe, if the UE fails to access a channel according to UL LBT prior to an $(n+6)^{th}$ subframe, the UE may fail to perform PUSCH transmission corresponding to the UL grant.

This is because, since an unlicensed band of LAA system corresponds to a band where a plurality of nodes of heterogeneous systems as well as the LAA system compete with each other for channel access via an LBT operation, as a duration between a UL grant transmitted in a specific subframe and PUSCH transmission is getting longer, it is highly probable that a channel is occupied by a different node. Hence, a probability of performing PUSCH transmission corresponding to the UL grant can be reduced.

If channel access is succeeded via an LBT operation, it may be preferable to maintain the channel access as long as possible by continuously transmitting a UL signal on the channel. In the following, for clarity, UL signal capable of being continuously transmitted by the UE within maximum COT (hereinafter, MCOT (maximum channel occupancy time)) in an unlicensed band is referred to as a UL transmission burst (UL Tx burst).

As an example applicable to the present invention, it may be able to configure a UE to perform UL transmission in contiguous subframes or transmit a UL Tx burst in a manner that a base station transmits contiguous UL grants to the UE. Yet, in the abovementioned example, transmission of the contiguous UL grants transmitted by the base station and continuous PUSCH transmission transmitted by the UE can be enabled only when both DL LBT of the base station and UL LBT of the user equipment are succeeded. Hence, the example may not be preferable in terms of implementation.

Figure 13:
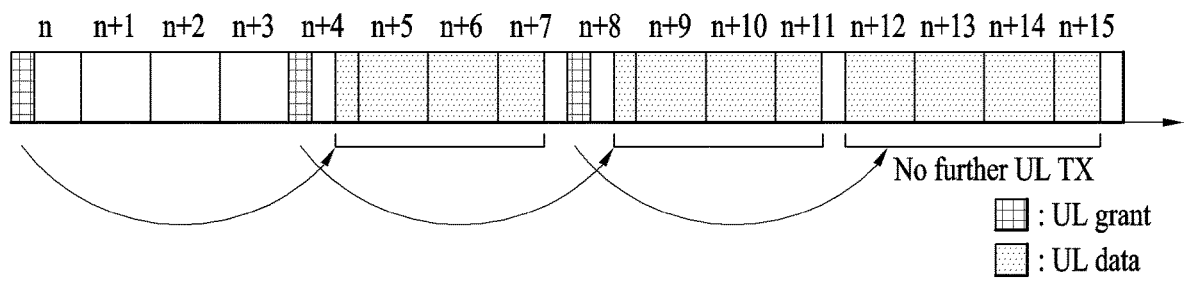
FIG. 13 is a diagram illustrating an operation of performing continuous UL transmission transmitted by a UE via multi-subframe scheduling.

Hence, it may consider multi-subframe scheduling (i.e., scheduling a plurality of subframes through a single UL grant) as a form advantageous for transmitting a UL Tx burst. FIG. 13 is a diagram illustrating an operation of performing continuous UL transmission transmitted by a UE via the multi-subframe scheduling.

As shown in FIG. 13, UL transmission including a UL grant and a partial TTI can be transmitted in a subframe (e.g., $(n+4)^{th}$ subframe, $(n+8)^{th}$ subframe) or UL transmission including a whole TTI can be transmitted in a subframe (e.g., $(n+12)^{th}$ subframe) without transmitting a separate UL grant.

Yet, in FIG. 13, since there exist subframes (e.g., $(n+1)^{th}$ subframe, $(n+2)^{th}$ subframe, $(n+3)^{th}$ subframe) in which a signal is not transmitted prior to a very first UL Tx burst, nodes of such a heterogeneous system as Wi-Fi may occupy a channel. And, as shown in FIG. 13, it may be difficult to apply an operation of performing UL transmission in the remaining subframes except the subframes in which a UL grant is transmitted to a case that COT of the UL Tx burst is equal to or greater than 4 TTIs (or 4 subframes). For example, a case of FIG. 4 is explained in the following.

Figure 14:
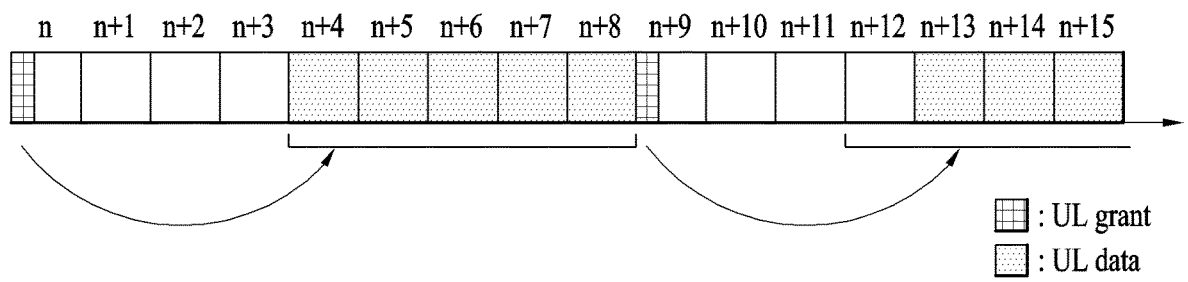
FIG. 14 is a diagram illustrating an operation when COT of a UL transmission burst corresponds to 5 TTI.

FIG. 14 is a diagram illustrating an operation when COT of a UL transmission burst corresponds to 5 TTI.

As shown in FIG. 14, an interval between the timing at which a specific UL grant is received and the timing at which PUSCH corresponding to the UL grant is transmitted corresponds to 4 TTIs (or 4 subframes). In this case, if a maximum length of a UL Tx burst is configured by 5 TTIs (or 5 subframes), it is unable to perform the contiguous PUSCH transmission shown in FIG. 13. Hence, it may have a case that there is a restriction on the maximum length of the UL Tx burst.

In order to solve the abovementioned problem, the present invention proposes a method of supporting a UE to perform UL transmission as continuous as possible In this case, the UL grant can be transmitted in a form of DL control information.

In the following, various modification examples of the present invention are proposed. All of the modification examples can be applied together except the items incapable of coexisting.

3.1 Embodiment 1

When a base station indicates multi-subframe scheduling on the L (L≥1) number of subframes via a single UL grant, the base station can provide information on a combination that selects L number of HARQ process indexes from among N (N≥L) number of HARQ process indexes to a UE using a UL grant (or common DCI).

In this case, the UE assumes that the L numbers of HARQ process indexes are applied as scheduling information of the L number of subframes in an ascending order (or descending order).

For example, assume that the base station performs multi-subframe scheduling on 4 subframes and supports 16 HARQ processes. In this case, the base station can inform the UE of a combination of selecting 4 HARQ processes from among the 16 HARQ processes via a bit field of 11-bit long (=log $2(_{16}C_4)$) of a UL grant. In particular, if the base station indicates a HARQ process index combination of 0, 5, 6, and 11, the UE may assume that the HARQ process indexes of 0, 5, 6, and 11 are sequentially delivered to the L number of subframes, which are scheduled by the base station in an order of a size of the HARQ process index, as scheduling information.

In addition, joint coding can be performed on information on the combination of selecting the L number of HARQ process indexes from among the N (N≥L) number of HARQ process indexes together with information on the K number of subframes in which scheduling is actually performed among the L number of subframes. In particular, the base station can indicate a combination of selecting L number of HARQ process indexes from among N number of HARQ process indexes, a combination of selecting (L−1) number of HARQ process indexes from among N number of HARQ process indexes, . . . , a combination of selecting one HARQ process index from among N number of HARQ process indexes using a specific bit field of a UL grant. For example, when the base station performs multi-subframe scheduling on 4 subframes and supports 16 HARQ processes, the base station performs joint coding or joint encoding on the number of actually scheduled subframes among the L number of subframes and a HARQ process index per subframe using $\log_2(_{16}C_1+_{16}C_2+_{16}C_3+_{16}C_4)=12$ bits and may be able to deliver a result of the joint coding to the UE.

In general, a base station informs a UE of a HARQ process index per subframe in a unit of 4 bits and informs the UE of the number of actually transmitted subframes among 4 subframes using an additional 2 bits. In particular, according to the present proposed method, the base station can save 6 bits compared to the total number of bits 4*4+2=18 bits of the general case.

3.1.1 Additional Embodiment 1

In case of performing joint coding on a combination of selecting K number of HARQ process indexes together with the K number of subframes in which scheduling is actually performed among N (N≥L) number of HARQ process indexes, a base station can perform joint coding on information such as RV (redundancy version) per subframe, NDI (new data indicator), LBT parameter, and the like for the K number of subframes. Specifically, the base station can configure a state to indicate a set consisting of information described in the following via a specific bit field of a UL grant.

(1) K Number of subframes in which scheduling is actually performed (2) Combination of K number of HARQ processes selected from among N number of HARQ process indexes (3) RV for each of K number of subframes (4) NDI for each of K number of subframes (5) LBT parameter for each of K number of subframes (6) Whether or not Tx gap exists and length of Tx gap for each of K number of subframes In this case, the LBT parameter corresponds to parameter values utilized for performing LBT. The LBT parameter can include defer length (mp), a maximum/minimum contention window value (CW), MCOT (maximum channel access occupancy time), etc. And, the Tx gap may correspond to a time period capable of performing an LBT operation while data transmission is not permitted.

In this case, the aforementioned joint coding or joint encoding can include all or a part of the abovementioned information. Specifically, when the base station indicates multi-subframe scheduling on the L number of subframes using a single UL grant, the joint coding can be performed on information on the K number of scheduled subframes and information on a parameter per subframe of the K number of subframes except information on a HARQ process index.

As a variation example, when HARQ process information is separated from information on the actually scheduled subframes, the base station informs the UE of L number of HARQ processes corresponding to the L number of subframe by indicating a combination consisting of L number of HARQ processes among the total N number of HARQ processes and can additionally informs the UE of information on actually valid HARQ processes among the L number of selected HARQ processes. For example, the base station can indicate whether or not each of the L number of selected HARQ processes is valid using a bitmap of L-bit long configured by 1 bit to indicate the actually valid HARQ processes.

Or, the base station can indicate one of all combinations that select N (N=1, 2, . . . , L) number of valid HARQ processes among the L number of selected HARQ processes. In particular, the base station can indicate one of all HARQ process combinations selecting one or more valid HARQ processes among the L number of selected HARQ processes. Specifically, the base station can indicate one of $_LC_1+_LC_2+\ldots+_LC_L$ number of combinations. For example, in order to indicate 4 HARQ processes among 16 HARQ processes, the base station informs the UE of information corresponding to $_{16}C_4$. The base station informs the UE of a valid process using information corresponding to $_4C_1+_4C_2+_4C_3+_4C_4$ instead of a field indicating a scheduled subframe. Or, the base station can inform the UE of a valid process among the 4 processes indicated by a HARQ process field using a separate 4-bit bitmap.

Or, the base station configures 4 HARQ processes to be respectively corresponded to 4 scheduling information and informs the UE of valid information among the 4 scheduling information using a bitmap or other method (an implicit method in each of the scheduling information, etc.)

In this case, when the minimum number of subframes scheduled by multi-subframe corresponds to Nmin, the base station can indicate one of all combinations that select N (Nmin≤N≤L) number of valid HARQ processes from among the L number of selected HARQ processes. In particular, the base station can inform the UE of one of all HARQ process combinations that select at least Nmin number of valid HARQ processes from among the L number of selected HARQ processes.

3.1.2 Additional Embodiment 2

When a base station indicates multi-subframe scheduling on the L (L≥1) number of subframes via a single UL grant, the base station can provide information on a combination that selects L number of HARQ process indexes from among N (N≥L) number of HARQ process indexes in a UL grant (or common DCI) to a UE by one-to-one matching the information to a specific value within [0, $_NC_{L-1}$] period.

(1) Combinations selecting L number of HARQ process indexes from among N (N≥L) number of HARQ process indexes (e.g., 0, 1, . . . , N−1) can be listed according to a lexicographical order. In this case, values ranging from 0 to $_NC_L$−1 can be assigned to each of the combinations listed according to the lexicographical order.

(2) When a specific combination consisting of L number of HARQ process indexes among {0, 1, . . . , N−1} corresponds to {$C_L$, . . . , $C_2$, $C_1$} and such a condition as $C_L > \ldots > C_2 > C_1 \geq 0$ is satisfied, a value of P according to equation 1 can be assigned to the combinations.

$$P = \binom{C_L}{L} + \ldots + \binom{C_2}{2} + \binom{C_1}{1} = \sum_{l=1}^{L} \binom{C_l}{l} \quad \text{where}$$ [Equation 1]

$$\binom{n}{k} = \begin{cases} \frac{n!}{k!(n-k)!} & \text{if } n \geq k \\ 0 & \text{if } n > k \end{cases}$$

In this case, a base station and a UE can perform encoding and decoding by utilizing a corresponding relation between a specific value indicating one of combinations that select L number of HARQ process indexes from among N number of HARQ process indexes and a HARQ process index combination.

In this case, $_nC_k$ corresponds to a binomial coefficient having indexes of n and k. If the binomial coefficient is represented by a factorial operator (=!), it can be represented as $_nC_k=n!/((k!)*(n-k)!)$.

In general, a specific combination consisting of L number of elements among {0, 1, . . . , N−1} can be represented by a specific natural number (including 0) due to the characteristic of a combination system. In particular, if the specific combination consisting of L number of elements among {0, 1, . . . , N−1} corresponds to {$C_L$, . . . , $C_2$, $C_1$} and such a condition as $C_L > \ldots > C_2 > C_1 \geq 0$ is satisfied, a value corresponding to the combination can be represented as the equation 1 above. Consequently, the corresponding relation may indicate the same corresponding relation that lists a combination selecting L number of elements from among N number of elements given by {0, 1, 2, . . . , N−1} according to the lexicographical order. For example, when N corresponds to 4 and L corresponds to 2, as shown in Table 2 in the following, each combination can be one-to-one matched with a specific value.

TABLE 2

| P | Combinations |
|---|---|
| 0 | {1, 0} |
| 1 | {2, 0} |
| 2 | {2, 1} |
| 3 | (3, 0) |
| 4 | {3, 1} |
| 5 | {3, 2} |

Hence, a combination of selecting L number of HARQ process indexes from among N number of HARQ process indexes can be matched with a specific value using the same logic. The base station performs encoding by matching a HARQ process index combination to a specific value using the abovementioned scheme and can forward the information to the UE via a UL grant. The UE performs decoding using a HARQ process index combination corresponding to a value indicated by a UL grant by utilizing the table to which the corresponding relation between the HARQ process index combination and the specific value is set. Or, the UE can perform decoding using a greedy algorithm described in the following.

When a base station provides a specific value P, an algorithm described in the following corresponds to a greedy algorithm for finding out a combination corresponding to the P among combinations that select L number of HARQ process indexes from among N number of HARQ process indexes. In this case, assume that the combination of the L number of HARQ process indexes selected from among the N number of HARQ process indexes given by {0, 1, 2, . . . , N−1} is represented as $\{C_L, \ldots, C_2, C_1\}$ and such a condition as $C_L > \ldots > C_2 > C_1 \geq 0$ is satisfied.

1) Among C satisfying $$\binom{C}{L} \leq P,$$

$C \in \{0, 1, \ldots, N-1\}$, a maximum value is selected as $C_L$

2) Among C satisfying $$\binom{C}{l} \leq P - \sum_{i=l+1}^{L}\binom{C_i}{i},$$

$C \in \{0, 1, \ldots, N-1\}$ for $l \in \{1, 2, \ldots, L-1\}$ in an ascending order (or descending order), a maximum value is selected as $C_l$ In this case, in the greedy algorithm, a binomial coefficient is defined as follows in a manner of being extended.

$$\binom{n}{k} = \begin{cases} \frac{n!}{k!(n-k)!} & \text{if } n \geq k \\ 0 & \text{if } n < k \end{cases} \quad \text{[Equation 2]}$$

In this case, a HARQ process index combination can be made as $\{C_L, \ldots, C_2, C_1\}$ according to a result of the decoding procedure.

3.1.3 Additional Embodiment 3

When a base station indicates multi-subframe scheduling on L (L≥1) number of subframes using a single UL grant, a combination of selecting the number of subframe scheduled in a UL grant (or DCI) and L number of HARQ process indexes from among N (N≥L) number of HARQ process indexes can be one-to-one matched with a specific value. Or, joint encoding can be performed on the combination using a specific value.

(1) Configure M (M≤L) number of available scheduled subframes (e.g., $\{S_1, S_2, \ldots, S_M\}$)

(2) When a specific combination consisting of $L=S_m$ (m∈{1, 2, . . . , M}) number of HARQ process indexes among N (N≥L) number of HARQ process indexes {0, 1, . . . , N−1} corresponds to $\{C_L, \ldots, C_2, C_1\}$ and such a condition as $C_L > \ldots > C_2 > C_1 \geq 0$ is satisfied, as shown in equation 3, a specific value P is assigned to the specific combination.

$$P = \sum_{l=1}^{L}\binom{C_l}{l} + I_m \text{ where} \quad \text{[Equation 3]}$$

$$\binom{n}{k} = \begin{cases} \frac{n!}{k!(n-k)!} & \text{if } n \geq k \\ 0 & \text{if } n < k \end{cases},$$

$$I_m = \begin{cases} 0 & m = 1 \\ \sum_{i=1}^{m-1}\binom{N}{S_i} & m \geq 2 \end{cases}$$

In this case, a base station and a UE can perform encoding and decoding by utilizing a corresponding relation between the specific value P and {number of scheduled subframes, HARQ process index combination}. And, the base station can configure a value of the number of scheduled subframes $\{S_1, S_2, \ldots, S_M\}$ via higher layer signaling.

The base station performs encoding on a specific value indicating a value corresponding to the HARQ process index combination via the abovementioned method and can forward the encoded value to the UE. The UE performs decoding using a HARQ process index combination corresponding to an encoded value in a UL grant by utilizing the table to which the corresponding relation between the HARQ process index combination and the specific value is set. Or, the UE can perform decoding as follows.

When a specific value P is given by the base station, a method of finding out a combination corresponding to the P among combinations that select L number of HARQ process indexes from among N number of HARQ process indexes is explained in the following. In this case, assume that such conditions as $C_L > \ldots > C_2 > C_1 \geq 0$ and $C_l \in \{0, 1, \ldots, N-1\}$, l=1, 2, . . . , L are satisfied.

1) Select m∈{1, 2, . . . , M} satisfying $I_m \leq P < I_{m+1}$ and $$I_m = \begin{cases} 0 & m = 1 \\ \sum_{i=1}^{m-1}\binom{N}{S_i} & m \geq 2 \end{cases}$$

2) Perform a greedy algorithm on $Q=P-I_m$ and $L=S_m$. Specifically, among C satisfying $$\binom{C}{L} \leq Q$$

and $C \in \{0, 1, \ldots, N-1\}$, a maximum value is selected as $C_L$. Among C satisfying $$\binom{C}{l} \leq Q - \sum_{i=l+1}^{L}\binom{C_i}{i}$$

and $C \in \{0, 1, \ldots, N-1\}$ for $l \in \{1, 2, \ldots, L-1\}$ in ascending order (or descending order), a maximum value is selected as $C_1$.

In this case, in the decoding procedure, a binomial coefficient can be defined as follows in a manner of being extended.

$$\binom{n}{k} = \begin{cases} \frac{n!}{k!(n-k)!} & \text{if } n \geq k \\ 0 & \text{if } n < k \end{cases} \quad \text{[Equation 4]}$$

In this case, number of scheduled subframes and a HARQ process index combination can be made as $S_m$ and $\{C_L, \ldots, C_2, C_1\}$, respectively, according to a result of the decoding procedure.

And, the base station can configure multi-subframe scheduling DCI supporting the number of scheduled subframes 2 and 4 only. If the total number of HARQ process indexes N corresponds 16, it may be able to indicate a case of total $_{16}C_2 + _{16}C_4$ by 11 bits in total using the joint coding scheme mentioned earlier in the additional embodiment 3. Since the case requires a bit width identical to a case of supporting the number of scheduled subframe 4 only, it may be able to increase scheduling flexibility without increasing DCI payload.

3.1.4 Additional Embodiment 4

When a base station indicates multi-subframe scheduling on L (L≥1) number of subframes using a single UL grant, M number of HARQ process groups respectively including N (N≥L) number of HARQ process indexes are defined via a predetermined scheme or higher layer signaling and the base station selects one from among the M number of HARQ process groups and informs a UE of the selected HARQ process group. In this case, the base station can also informs the UE of a combination that selects L number of HARQ process indexes from among L number of HARQ process indexes included in the selected HARQ process group.

In this case, a union of the M number of HARQ process groups includes the total HARQ process indexes and the UE assumes that the L numbers of HARQ process indexes are applied as scheduling information of the L number of subframes in ascending order (or descending order).

For example, the base station can define 2 HARQ process groups including $\{0, 1, \ldots, 7\}$ and $\{8, 9, \ldots, 15\}$ for 16 HARQ processes in total given by $\{0, 1, \ldots, 15\}$. In this case, assume that the base station performs multi-subframe scheduling on 4 subframes. According to the additional embodiment 4, the base station indicates one of the two HARQ process groups using 1 bit of a UL grant and can inform the UE of a combination that selects 4 HARQ processes from among 8 HARQ processes using a bit field of 7-bit long ($\geq \log_2(_8C_4)$) of the UL grant. In particular, if the base station indicates a HARQ process index combination $\{0, 2, 5, 6\}$ among a HARQ process group of $\{0, 1, \ldots, 7\}$, the UE may assume that HARQ process indexes 0, 2, 5, and 6 are delivered to the L number of subframes scheduled by the base station as scheduling information in an ascending order a size of the HARQ process index.

A logical index (e.g., $0, 1, \ldots, N-1$) for HARQ processes belonging to a specific HARQ process group indicated by the base station can be applied to "N (N≥L) number of HARQ process indexes" mentioned earlier in the aforementioned embodiment 1, the additional embodiment 2, and the additional embodiment 3. Subsequently, the operations mentioned earlier in the embodiment 1, the additional embodiment 2, and the additional embodiment 3 can be extensively applied to the logical index. For example, if the base station indicates a HARQ group defined by $\{X_1, X_2, \ldots, X_N\}$, it may sequentially assign such a logical index as $\{0, 1, \ldots, N-1\}$ to the HARQ processes.

3.2 Embodiment 2

When a base station indicates multi-subframe scheduling on L (L≥1) number of subframes using a single UL grant, the base station informs a UE of an MCS (modulation and coding scheme) to be commonly applied to subframes in which initial transmission is performed and an MCS to be commonly applied to subframes in which retransmission is performed, respectively.

When multi-subframe scheduling on a plurality of subframes is indicated using a single UL grant, a bit number in DCI indicating the UL grant can be increased in proportion to the number of scheduled subframes. For example, in case of an NDI (new data indicator) field, it is preferable that a bit number is indicated according to each of L number of subframes scheduled by the base station in terms of increasing scheduling flexibility. Yet, if DCI payload increases, a coding gain can be relatively decreased. Hence, it may have a demerit in that reliability is deteriorated.

Hence, when a single DCI indicating the multi-subframe scheduling is designed, the present invention proposes a design method considering both scheduling flexibility and DCI payload.

For example, since the multi-subframe scheduling indicates transmission of a plurality of subframes transmitted to a single UE, it may consider a method of commonly applying an MCS field value to all subframes. In this case, if a part of a plurality of the subframes indicated by a UL grant corresponds to subframes in which initial transmission is performed and a part of a plurality of the subframes corresponds to subframes in which retransmission is performed, it may be preferable that an independent MCS value is configured between the two groups. This is because it is preferable to set a lower MCS value to the subframes in which retransmission is performed to increase transmission probability.

Hence, the present invention proposes a method of informing a UE of an MCS to be commonly applied to subframes in which initial transmission is performed and an MCS to be commonly applied to subframes in which retransmission is performed, respectively, using a UL grant.

Or, as a variation example, the base station can provide the UE with a relative offset value for a first MCS value instead of the first MCS value applied to one group among the two groups and a second MCS value applied to another group via a UL grant.

3.3 Embodiment 3

When a base station indicates multi-subframe scheduling on L (L≥1) number of subframes using a single UL grant, the base station informs a UE of RA (resource allocation) to be commonly applied to subframes in which initial transmission is performed and RA to be commonly applied to subframes in which retransmission is performed, respectively.

As mentioned earlier in the embodiment 2, when multi-subframe scheduling on a plurality of subframes is indicated using a single UL grant, a bit number in DCI indicating the UL grant can be increased in proportion to the number of scheduled subframes.

In particular, since the multi-subframe scheduling indicates transmission of a plurality of subframes transmitted to a single UE, it may consider an operation of commonly applying an RA field. In this case, if a part of a plurality of the subframes indicated by a single UL grant corresponds to subframes in which initial transmission is performed and a part of a plurality of the subframes corresponds to subframes in which retransmission is performed, it may be preferable that an independent RA value is configured between the two groups.

Hence, the present invention proposes a method of informing a UE of RA to be commonly applied to subframes in which initial transmission is performed and RA to be commonly applied to subframes in which retransmission is performed, respectively, using the UL grant.

3.4 Embodiment 4

When a base station indicates multi-subframe scheduling on L (L≥1) number of subframes using a single UL grant, the base station indicates whether a transmission corresponds to initial transmission or retransmission using a flag in the UL grant.

In this case, information on whether the transmission corresponds to the initial transmission or the retransmission can be applied to all subframes corresponding to targets of the multi-subframe scheduling.

As mentioned earlier in the embodiment 2 and the embodiment 3, when the base station indicates the multi-subframe scheduling, if such information as MCS, RA, etc. is indicated according to a subframe, DCI payload can be considerably increased. Hence, MCS and RA information in multi-subframe scheduling DCI can be shared between target subframes.

In this case, if subframes in which initial transmission is performed and subframes in which retransmission is performed coexist in the multi-subframe scheduling DCI, it is difficult to share the MCS and the RA information. Hence, preferably, the base station can indicate scheduling to be performed on either the subframes in which initial transmission is performed or the subframes in which retransmission is performed using the multi-subframe scheduling DCI.

In this case, if the base station informs the UE of whether the multi-subframe scheduling DCI is used for the initial transmission or the retransmission, it may be able to explicitly define a UE operation. In particular, when the UE incorrectly recognizes toggling of NDI (e.g., when the UE recognizes the toggling of the NDI as retransmission instead of initial transmission), it may be able to correct the initial transmission operation or the retransmission operation through the additional information.

3.5 Embodiment 5

When a base station configures multi-subframe scheduling DCI (hereinafter, MSF DCI) capable of scheduling maximum L (L≥1) number of subframes using a single UL grant, if the base station indicates a single HARQ ID (=HARQ process number) value within the MSF DCI and a bitmap of L-bit long indicating whether or not scheduling is performed on each subframe, a UE applies HARQ ID values sequentially increasing (or decreasing) from the indicated HARQ ID value to scheduled subframes.

In this case, the bitmap indicating whether or not scheduling is performed on a subframe may imply UL timing of the subframe.

When the base station indicates scheduling on a plurality of subframes via the MSF DCI, although it may be able to individually indicate a HARQ ID (e.g., HARQ process number) for scheduled subframe, it may consider an operation of indicating a single HARQ ID and applying an HARQ ID sequentially increasing from the HARQ ID to scheduling target subframes to reduce DCI overhead. For example, in case of MSF DCI that schedules 4 subframes, if the base station indicates 2 as a HARQ ID value, the UE may assume that HARQ ID values corresponding to 2, 3, 4, and 5 are sequentially applied to the 4 subframes.

In this case, the base station can forward information on a bitmap of L-bit long indicating whether or not scheduling is performed on each subframe to the UE using the MSF DCI to perform scheduling on non-consecutive subframes. In this case, if the UE assumes a sequential HARQ ID value for L number of subframes by assuming maximum number of subframes capable of being scheduled by the MSF DCI, the HARQ ID value, which is capable of being allocated by the information on the bitmap of L-bit long indicating whether or not scheduling is performed on each subframe, can be restricted.

For example, assume that the base station indicates actual scheduling to be performed on a first subframe and a fourth subframe for MSF DCI indicating multi-subframe scheduling on maximum 4 subframes. In this case, a bitmap (e.g., [1 0 0 1]) of 4-bit long can be forwarded to the UE. If a HARQ ID value starting from 2 is sequentially allocated to 4 subframes according to the bitmap, a HARQ ID value of 2 is allocated to the first subframe and a HARQ ID value of 5 is allocated to the fourth subframe. Since the above operation combines scheduling information per subframe with HARQ ID information, it may set restriction on scheduling flexibility of the base station.

Hence, the present invention proposes a method of assigning sequential HARQ ID values to actually scheduled subframes only. In particular, in the aforementioned example, if the bitmap of 4-bit long (e.g., [1 0 0 1]) is forwarded to the UE, a HARQ ID value of 2 is allocated to the first subframe and a HARQ ID value of 3 is allocated to the fourth subframe.

3.6 Embodiment 6

When a base station configures multi-subframe scheduling DCI (MSF DCI) capable of scheduling maximum L (L≥1) number of subframes using a single UL grant, if the base station indicates a single HARQ ID (=HARQ process number) value within the MSF DCI, a UE applies HARQ ID values sequentially increasing (or decreasing) from the indicated HARQ ID value to the L number of subframes. In this case, the base station indicates actually scheduled HARQ ID values via information on a bitmap of L-bit long within the MSF DCI.

In this case, the scheduled HARQ ID values indicated by the MSF DCI can be transmitted in contiguous subframes.

As mentioned in the foregoing description, if the base station indicates the single HARQ ID, the UE assumes maximum L number of scheduling subframes and may determine that HARQ ID values sequentially increasing from the HARQ ID value indicated by the base station are applied to the L number of subframes.

In this case, in order to increase scheduling flexibility of the base station, it may consider a method of indicating a combination of HARQ ID values consisting of partial HARQ ID values among the L number of HARQ ID values. As a method of indicating the partial HARQ ID values among the L number of HARQ ID values, it may indicate actually scheduled HARQ ID values using information on a bitmap of L-bit long within MSF DCI. For example, in case of MSF DCI that schedules maximum 4 subframes, if the base station indicates a HARQ ID value of 2, the UE may assume that sequentially increasing 4 HARQ ID values (e.g., 2, 3, 4 and 5) are configured.

In this case, the base station can additionally inform the UE of actually scheduled HARQ ID values among the 4 HARQ ID values using bitmap information of 4-bit long. For example, the base station forwards such a bitmap of 4-bit long as [1 0 0 1] to the UE to indicate that HARQ IDs 2 and 5 are scheduled. Hence, the UE can perform PUSCH transmission on the HARQ IDs 2 and 5 in 2 contiguous subframes.

3.7 Embodiment 7

When a base station configures multi-subframe scheduling DCI (MSF DCI) capable of scheduling maximum L (L≥1) number of subframes using a single UL grant, a specific state of a bit field, which indicates a scheduling defer value, belonging to the MSF DCI indicates one of information described in the following.

(1) $k_{min}$
(2) $k_{min}+L$
(3) M+1−L
(4) M+2
(5) Scheduling defer value configured via higher layer signaling (such as RRC)

The base station can indicate elements belonging to SA or SB defined as follows using the scheduling defer value via the MSF DCI. In this case, it may include a scheduling defer value implicitly indicated by the MSF DCI.

1) $S_A=\{k_{min}, kmin+1, M, M+2, M+3, M+k_{min}\}$. In other word, an integer k satisfying $k_{min} \leq k \leq M$ or $M+2 \leq k \leq M+k_{min}$ is included in the $S_A$.

2) $S_B=\{M+1-L, M+2-L, M, M+2, M+3, M+1+L\}$. In other word, an integer k satisfying $M+1-L \leq k \leq M$ or $M+2 \leq k \leq M+1+L$ is included in the $S_B$.

In this case, when the scheduling defer value corresponds to k, it means that UL transmission for an $n^{th}$ subframe is performed in an $(n+k)^{th}$ subframe. And, the $k_{min}$ corresponds to a minimum scheduling defer value and one of 5 values described in the following can be applied to the M.

Figure 15:
FIG. 15 is a diagram illustrating a case that the maximum number of UL subframes capable of being continuously transmitted corresponds to 8.

① Maximum number of UL subframes capable of being continuously transmitted
② Number of UL subframes corresponding to UL maximum channel occupancy time (UL MCOT)
③ Maximum number of UL subframes capable of being scheduled in a DL subframe
④ A predefined value or a value configured via higher layer signaling (irrespective of $k_{min}$)
⑤ 2*L For example, when UL traffic exists only in a specific cell of LAA system according to the present invention and self-carrier scheduling is configured for UL transmission, it may consider a structure of transmitting a UL grant and PUSCH described in FIG. 15 to support continuous PUSCH transmission as much as possible.

FIG. 15 is a diagram illustrating a case that the maximum number of UL subframes capable of being continuously transmitted corresponds to 8 (M=8).

Figure 16:
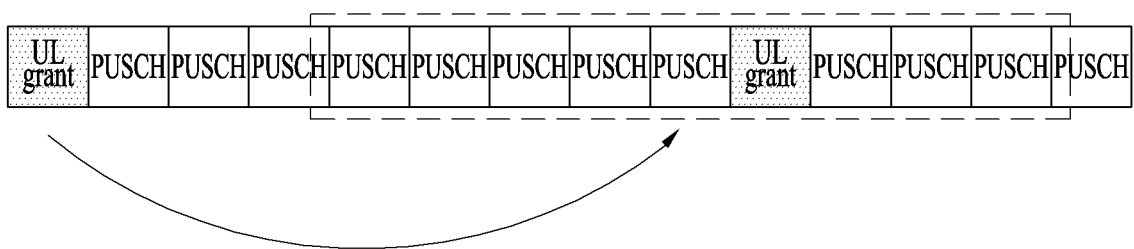
FIG. 16 is a diagram illustrating a first configuration that scheduling is performed on 8 subframes by a single UL grant in FIG. 15.
Figure 17:
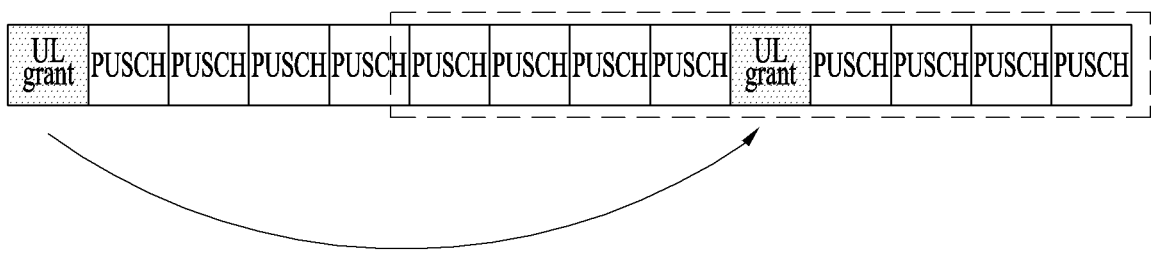
FIG. 17 is a diagram illustrating a second configuration that scheduling is performed on 8 subframes by a single UL grant in FIG. 15.

As shown in FIG. 15, when the maximum number of UL subframes capable of being continuously transmitted corresponds to M, a UL grant should perform scheduling on the M number of subframes. As shown in FIG. 16 or FIG. 17, the UL grant can indicate scheduling on the M number of UL subframes appearing first from the timing at which minimum scheduling defer is applied (except a subframe in which the YL grant is transmitted).

FIG. 16 is a diagram illustrating a first configuration that scheduling is performed on M number of subframes by a single UL grant in FIG. 15 and FIG. 17 is a diagram illustrating a second configuration that scheduling is performed on the M number of subframes by a single UL grant in FIG. 15.

More specifically, when a minimum scheduling defer value corresponds to $k_{min}$, a UL grant (or MSF DCI) can indicate an integer k satisfying $k_{min} \leq k \leq M$ or $M+2 \leq k \leq M+kmin$ and the above configuration corresponds to the scheduling defer values proposed as SA in the embodiment 7. For example, if $k_{min}$ corresponds to 4 and M corresponds to 8, UL timing according to SA becomes an $(n+4)^{th}$ subframe, an $(n+5)^{th}$ subframe, an $(n+6)^{th}$ subframe, an $(n+7)^{th}$ subframe, an $(n+8)^{th}$ subframe, an $(n+10)^{th}$ subframe, an $(n+11)^{th}$ subframe, and an $(n+12)^{th}$ subframe.

Yet, if scheduling is performed as shown in FIG. 15, MSF DCI should support scheduling on maximum 5 subframes. In this case, in order to reduce DCI overhead for the MSF DCI, UL timing can be defined on the basis of the maximum number of subframes L capable of being scheduled by the MSF DCI. For example, similar to the SB mentioned earlier in the embodiment 7, the MSF DCI may indicate an integer k satisfying $M+1-L \leq k \leq M$ or $M+2 \leq k \leq M+1+L$ as a scheduling defer value. In this case, although the MSF DCI supports scheduling on maximum 4 subframes only, the MSF DCI can support continuous PUSCH transmission shown in FIG. 15. For example, if $k_{min}$ corresponds to 4 and M corresponds to 8, UL timing according to the SB may become an $(n+5)^{th}$ subframe, an $(n+6)^{th}$ subframe, an $(n+7)^{th}$ subframe, an $(n+8)^{th}$ subframe, an $(n+10)^{th}$ subframe, an $(n+11)^{th}$ subframe, an $(n+12)^{th}$ subframe, and an $(n+13)^{th}$ subframe.

3.8 Embodiment 8

When a base station configures multi-subframe scheduling DCI (MSF DCI) capable of scheduling a plurality of codewords (or TB (transport block)) as many as N (N≥2) for the maximum L (L≥1) number of subframes using a single UL grant, the base station indicates a commonly applied RV (redundancy version) using one of methods described in the following.

(1) Independent RV value is indicated according to a subframe and RV is commonly applied to codewords (or transport blocks) (belonging to the same subframe).

(2) Independent RV value is indicated according to a codeword index and RV is commonly applied to codewords (or transport blocks) (belonging to the same subframe).

In LTE system according to the present invention, a coded bit for transmitting data is generated on the basis of a mother code rate. In this case, an amount of bits capable of being actually transmitted is restricted by an allocated resource, MCS, and the like. As a result, a case of transmitting only a part of coded bits, which are generated on the basis of the mother code rate, may occur.

In this case, RV can indicate a transmitted part among the coded bits. It is referable that information on the RV is indicated according to a codeword (or a transport block). In the LTE system according to the present invention, an RV value is configured by 2 bits and can indicate one of values including 0, 1, 2, and 3 according to a codeword (or a transport block).

Yet, if the MSF DCI, which indicates scheduling to be performed on multi-subframe, individually indicates RV information of 2-bit long in every codeword (or transport block), it may require too much bits width or bit numbers. As a result, it increases payload of the MSF DCI.

Hence, the present invention proposes a method of reducing a bit width (or a bit number) of DCI scheduling multi-subframe by commonly applying RV to a plurality of codewords or a plurality of subframes.

For example, a base station informs a UE of an independent RV value according to a subframe via a UL grant (or MSF DCI) and the UE can apply a common RV to codewords in the same subframe based on the information.

Or, the base station informs the UE of an independent RV value according to a codeword index via a UL grant (or MSF DCI) and the UE can apply a common RV to codewords having the same codeword index. In particular, a codeword having a codeword index 0 may have a single RV value for all subframes scheduled by the MSF DCI.

As an additional embodiment, a range of RV values capable of being indicated using the MSF DCI can be restricted to be smaller than a range of RV values indicated by a DCI (SSF DCI). For example, in order to reduce a DCI size, the MSF DCI according to the present invention can indicate one of {0, 3} as an RV value.

The abovementioned configuration is described in more general in the following. If the SSF DCI is able to indicate one from among $K_1$ number of values as RV information according to a codeword, the MSF DCI can indicate one from among $K_2$ number of values as RV information according to a codeword. In this case, a specific state of a specific bit field belonging to the MSF DCI can indicate an RV value configured by higher layer signaling.

3.9 Embodiment 9

When a base station configures multi-subframe scheduling DCI (MSF DCI) capable of scheduling a plurality of codewords (or TB (transport block)) as many as N (N≥2) for the maximum L (L≥1) number of subframes using a single UL grant, the base station informs a UE of an independent NDI value according to a subframe via the MSF DCI and the UE applies a common NDI value to a codeword (or a transport block) belonging to the same subframe.

In the LTE system according to the embodiment of the present invention, an NDI corresponds to information of 1-bit long and indicates whether a transmission corresponds to an initial transmission or a retransmission according to toggling between 0 and 1. Since the NDI is indicate by the toggling, codewords sharing the NDI information should always be retransmitted together. In this case, since a different HARQ process is performed on a plurality of subframes scheduled by the MSF DCI, a retransmission procedure should be independently performed. Hence, it is preferable that the NDI is indicated according to a subframe.

In this case, if a plurality of codewords (or transport blocks) belonging to the same subframe are scheduled using the MSF DCI, since the codewords follow the same HARQ process, although a constraint occurs in performing scheduling, it may apply an operation of retransmitting a plurality of the codewords (or transport blocks). As mentioned in the foregoing description, if the NDI is commonly applied to the codewords (or transport blocks) belonging to the same subframe, it may be able to reduce a bit width (or bit number) of DCI for NDI indication.

4. Device Configuration

Figure 18:
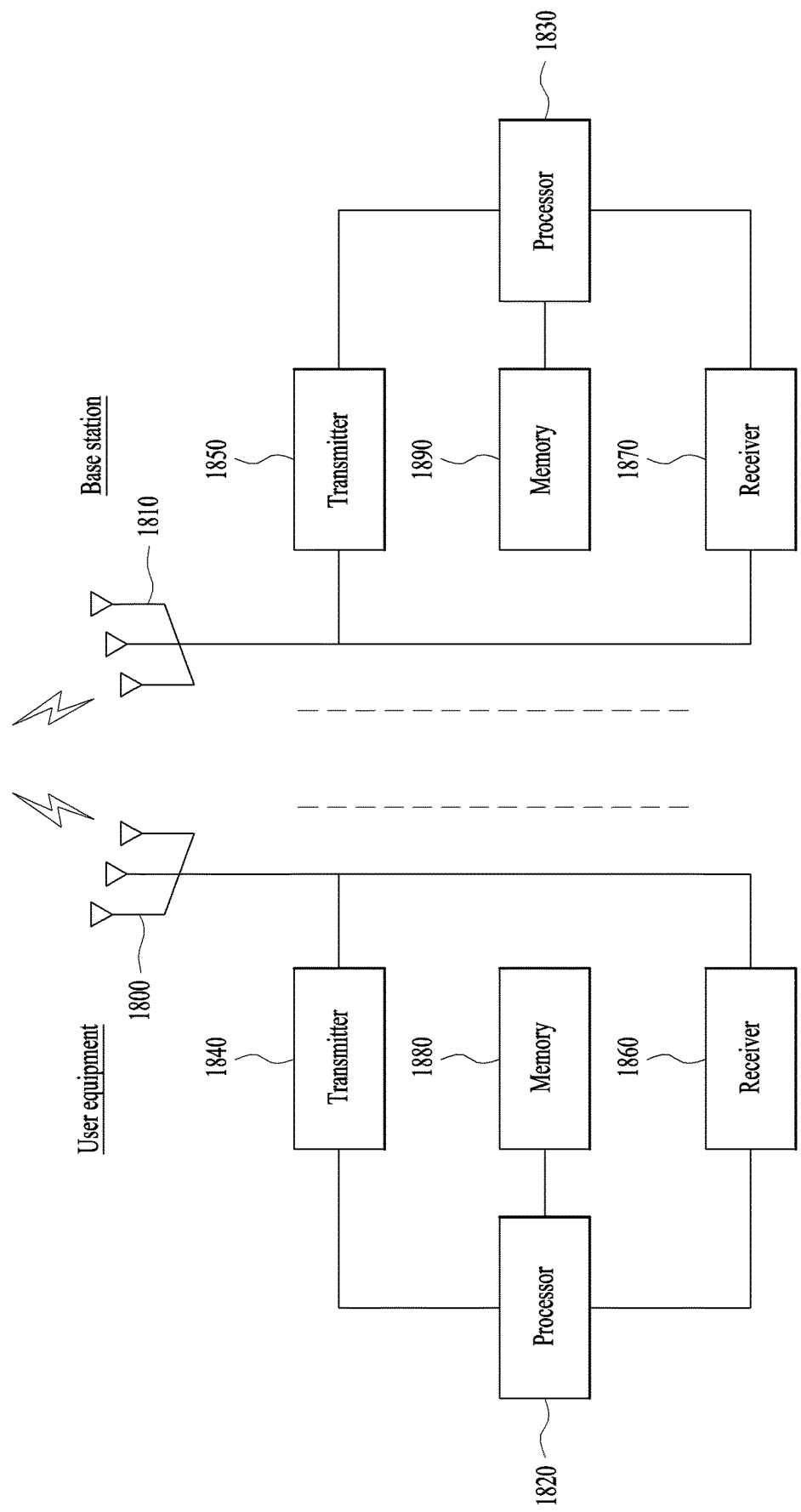
FIG. 18 is a diagram illustrating configurations of a UE and a base station capable of being implemented by the embodiments proposed in the present invention.

FIG. 18 is a diagram illustrating configurations of a UE and an eNB capable of being implemented by the embodiments proposed in the present invention. The UE and the eNB shown in FIG. 18 operate to implement the embodiments of the method of transmitting and receiving a UL signal between the UE and the eNB.

A UE may act as a transmission end on a UL and as a reception end on a DL. An eNB may act as a reception end on a UL and as a transmission end on a DL.

That is, each of the UE and the eNB may include a Transmitter (Tx) 1840 or 1850 and a Receiver (Rx) 1860 or 1870, for controlling transmission and reception of information, data, and/or messages, and an antenna 1800 or 1810 for transmitting and receiving information, data, and/or messages.

Each of the UE and the eNB may further include a processor 1820 or 1830 for implementing the afore-described embodiments of the present disclosure and a memory 1880 or 1890 for temporarily or permanently storing operations of the processor 1820 or 1830.

The UE receives a UL grant for scheduling UL signal transmission for one or more subframes from the eNB via the processor 1820. In this case, the UL grant individually indicates an RV (redundancy version) for the one or more subframes and applies the same (or identical) RV value to a plurality of codewords for each of the one or more subframes. By doing so, it may be able to configure the UL signal to be transmitted in a time resource scheduled by the UL grant.

The eNB transmits a UL grant for scheduling UL signal transmission for one or more subframes to the UE via the processor 1830. In this case, the UL grant individually indicates an RV (redundancy version) for the one or more subframes and applies the same RV value to a plurality of codewords for each of the one or more subframes. By doing so, it may be able to configure the UL signal to be received in a time resource scheduled by the UL grant.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 18 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1880 or 1890 and executed by the processor 1820 or 1830. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of transmitting an uplink signal by a user equipment to a base station in a wireless communication system supporting an unlicensed band, the method comprising:
receiving, from the base station, downlink control information (DCI) for scheduling uplink signal transmission for one or more subframes, wherein the DCI includes a redundancy version (RV) value for a subframe included in the one or more subframes; and
transmitting the uplink signal in the one or more subframes scheduled by the DCI by applying the RV value to the subframe,
wherein based on that a number of subframes scheduled by the DCI is one, the RV value corresponding to the subframe is represented by 2 bits in the DCI,
wherein based on that the number of subframes scheduled by the DCI is two or more, the RV value corresponding to the subframe is represented by 1 bit in the DCI, and
wherein a respective RV value for each of a plurality of codewords included in the subframe is identical to the RV value for the subframe.

2. The method of claim 1, wherein the DCI further includes a combination of selecting HARQ process indexes applied to the one or more subframes from among N number of HARQ (hybrid automatic retransmission request) process indexes and the user equipment transmits the uplink signal in the scheduled time resource based on the HARQ process indexes applied to the one or more subframes.

3. The method of claim 2, wherein the HARQ process indexes included in the DCI for the one or more subframes are applied according to a prescribed order.

4. A method of receiving an uplink signal by a base station from a user equipment in a wireless communication system supporting an unlicensed band, the comprising:
transmitting, to the user equipment, downlink control information (DCI) for scheduling uplink signal transmission for one or more subframes, wherein the DCI includes a redundancy version (RV) value for a subframe included in the one or more subframes; and
receiving the uplink signal in the one or more subframes scheduled by the DCI,
wherein the RV value is applied to the subframe,
wherein based on that a number of subframes scheduled by the DCI is one, the RV value corresponding to the subframe is represented by 2 bits in the DCI, and
wherein based on that the number of subframes scheduled by the DCI is two or more, the RV value corresponding to the subframe is represented by 1 bit in the DCI, and
wherein a respective RV value for each of a plurality of codewords included in the subframe is identical to the RV value for the subframe.

5. The method of claim 4, wherein the DCI further includes a combination of selecting HARQ process indexes applied to the one or more subframes from among N number of HARQ (hybrid automatic retransmission request) process indexes and the base station receives the uplink signal in the scheduled time resource based on the HARQ process indexes applied to the one or more subframes.

6. The method of claim 5, wherein the HARQ process indexes included in the DCI are applied to the one or more subframes according to a prescribed order.

7. A user equipment configured to transmit an uplink signal to a base station in a wireless communication system supporting an unlicensed band, the user equipment comprising:
a receiver;
a transmitter; and
a processor configured to operate in a manner of being connected with the receiver and the transmitter, the processor configured to:
receive, from the base station, downlink control information (DCI) for scheduling uplink signal transmission for one or more subframes, wherein the DCI includes a redundancy version (RV) value for a subframe included in the one or more subframes, and transmit the uplink signal in the one or more subframes scheduled by the DCI by applying the RV value to the subframe, wherein based on that a number of subframes scheduled by the DCI is one, the RV value corresponding to the subframe is represented by 2 bits in the DCI, wherein based on that the number of subframes scheduled by the DCI is two or more, the RV value corresponding to the subframe is represented by 1 bit in the DCI, and wherein a respective RV value for each of a plurality of codewords included in the subframe is identical to the RV value for the subframe.

8. A base station configured to receive an uplink signal from a user equipment in a wireless communication system supporting an unlicensed band, the base station comprising:

a receiver;

a transmitter; and a processor configured to operate in a manner of being connected with the receiver and the transmitter, the processor configured to:

transmit, to the user equipment, downlink control information (DCI) for scheduling uplink signal transmission for one or more subframes, wherein the DCI includes a redundancy version (RV) value for a subframe included in the one or more subframes; and receive the uplink signal in the one or more subframes scheduled by the DCI, wherein the RV value is applied to the subframe, wherein based on that a number of subframes scheduled by the DCI is one, the RV value corresponding to the subframe is represented by 2 bits in the DCI, wherein based on that the number of subframes scheduled by the DCI is two or more, the RV value corresponding to the subframe is represented by 1 bit in the DCI, and wherein a RV value for each of a plurality of codewords included in the subframe is identical to the RV value for the subframe.

* * * * *